United States Patent Office 2,771,477
Patented Nov. 20, 1956

2,771,477

LOW VOLATILE HERBICIDAL COMPOSITIONS

Lindley S. De Atley, Kansas City, Mo., Edwin T. Upton, Mission, Kans., and John D. Howland, Kansas City, Mo., assignors to Thompson-Hayward Chemical Company, Kansas City, Mo., a corporation of Missouri No Drawing. Application June 6, 1952,
Serial No. 292,186

3 Claims. (Cl. 260—404)

This invention relates to improvements in low volatile plant growth regulators, and refers more particularly to herbicides having as the active ingredients aryloxy-alkane-carboxylic acid esters of alkanolamines which have at least one free hydroxy group.

It has been known that the esters of aryloxy-alkane-carboxylic acids are effective in weed and brush control, but principally the compounds of relatively high volatility have been used which are objectionable because of their effect on adjoining vegetation. The esters of lower molecular weight, such as methyl, ethyl, isopropyl, butyl and amyl, are sufficiently volatile that unsprayed vegetation adjacent that which has been sprayed may be damaged through vapor action. Also, some of the higher molecular weight esters of the aryloxy-alkane-carboxylic acids are much less damaging or even non-injurious to adjacent vegetation. It is the aim and purpose of the present invention to propose esters of the aryloxy-alkane-carboxylic acids other than those heretofore known which are of low volatility but still effective in controlling weeds and brush.

Carefully conducted tests show that even some of the low volatile esters of the aryloxy-alkane-carboxylic acids are sufficiently volatile to damage susceptible vegetation contacted by their vapors. Also, some lack solubility which is a limiting factor to their use; others of these low volatile esters unless carefully neutrailzed or formulated with an inhibitor are sufficiently acid to attack steel shipping containers causing corrosion of the container and deterioration of the herbicide.

It has been found that many of the alkanolamines may be combined with aryloxy-alkane-carboxylic acids and in some instances with other materials to form relatively non-volatile esters which are effective herbicides and because of the slightly basic reaction of the alkanolamine esters, herbicides made from them are very mildly alkaline and much less corrosive to metal containers than the acidic herbicides.

Examples of alkanolamines which have been successfully used are as follows:

Diethanolamine _____ HN(CH₂CH₂OH)₂
Diisopropanolamine _____ HN(CH₂CHOHCH₃)₂
Triethanolamine _____ N(CH₂CH₂OH)₃
Triisopropanolamine _____ N(CH₂CHOHCH₃)₃

Phenyldiethanolamine _____ N(CH₂CH₂OH)₂.

Ethyldiethanolamine _____ C₂H₅N(CH₂CH₂OH)₂
Complex alkanolamines ____ RR'NCₙH₂ₙOH In the formula for complex alkanolamines, "n" represents a numeral equal to 1 or more while "R" and "R'" may represent hydrogen or any alkyl or aryl group as in phenyldiethanolamine or ethyldiethanolamine.

Some of the aryloxy-alkane-carboxylic acids which have been used in the esterification reaction are listed below:

2,4-dichlorophenoxyacetic acid
2,4,5-trichlorophenoxyacetic acid
2-methyl-4-chlorophenoxyacetic acid
Phenoxyacetic acid
Phenoxypropionic acid
4-chlorophenoxyacetic acid
4-bromophenoxyacetic acid

*Alkanolamine esters of 2,4-dichlorophenoxyacetic acid and 2,4,5-trichlorophenoxyacetic acid*

The preparation of alkanolamine esters of 2,4-dichlorophenoxyacetic acid and 2,4,5-trichlorophenoxyacetic acid is accomplished by heating toegther a mixture of an alkanolamine and 2,4-dichlorophenoxyacetic acid and/or 2,4,5-trichlorophenoxyacetic acid and a water immiscible solvent nonreactive to either the acid or amine. The amount of acid used is preferably that which would theoretically combine with the alcoholic portion of the alkanolamine to be esterified. The amount of inert solvent used should be just sufficient to disolve the reactions and provide a solution which will boil without "bumping" and which will boil at a sufficiently low temperature to prevent charring or discoloration of the reactants during the esterification step. Solvents adapted for this purpose are benzene, toluene, xylene, ethylene dichloride, carbon tetrachloride, petroleum naphtha or any other solvent which is water immiscible and will not interfere with the reaction and which boils at a sufficiently low temperature to prevent decomposition of the reactants. A catalyst, such as sulphuric acid, may be added in small amounts (0.1% to 0.5% of the weight of the reactants) to accelerate the esterification, but its use is not essential.

In the esterification of triethanolamine with either 2,4-dichlorophenoxyacetic acid or 2,4,5-trichlorophenoxyacetic acid, it is theoretically possible to esterify either one, two or three of the hydroxy groups (alcohol or OH); thus forming what is termed the triethanolamine mono-ester, di-ester or tri-ester, as the case may be. It has been found that this is true from the practical standpoint, as well as from a theoretical standpoint.

EXAMPLE NO. 1

The triethanolamine, 2,4-D tri-ester has the following theoretical structural formula:

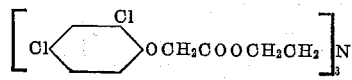

It is produced in the following manner:

2,4-dichlorophenoxyacetic acid (100 grams) is mixed with 22½ grams of commercial triethanolamine and 17 grams of benzene. The vessel in which these materials are mixed is connected to a condenser and trap. Upon boiling of the mixture, the benzene and the water formed through the reaction of the triethanolamine and 2,4-dichlorophenoxyacetic acid are condensed and run into the trap. The water settles to the bottom of the trap and the benzene fills the trap, overflows, and returns by gravity to the reaction vessel. The components are boiled until the amount of water collected in the trap equals that theoretically formed in this esterification reaction. The benzene is then removed by distillation yielding triethanolamine, 2,4-D tri-ester.

EXAMPLE NO. 2

Similarly, triethanolamine, 2,4,5-T di-ester, having the chemical formula indicated below can be produced.

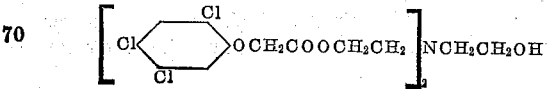

To produce this ester, the procedure indicated by the above example is followed using 100 grams of 2,4,5-trichlorophenoxyacetic acid, 29 grams of triethanolamine, and 25 grams of benzene.

EXAMPLE NO. 3

The triisopropanolamine di-ester of 2,4-D having the formula given below can be prepared as follows:

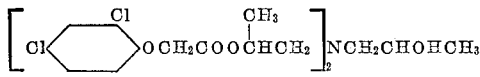

With 100 grams of 2,4-dichlorophenoxyacetic acid is mixed 43.2 grams of triisopropanolamine and 25 grams of benzene. The procedure is identical to that outlined in the first example.

EXAMPLE NO. 4

The diethanolamine 2,4-D di-ester whose chemical formula is indicated below, also has been prepared.

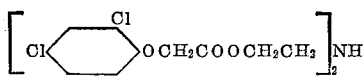

To produce this ester, 100 grams of 2,4-dichlorophenoxyacetic acid is allowed to react with 23.7 grams of commercial diethanolamine in the presence of 12 grams of benzene. The procedure is substantially the same as that outlined in Example No. 1.

EXAMPLE NO. 5

Also, it is possible to produce a mixed ester of 2,4-dichlorophenoxyacetic acid and 2,4,5-trichlorophenoxyacetic acid with a di- or trialkanolamine.

The formula for triethanolamine 2,4,5-T di-ester, 2,4-D mono-ester is one example:

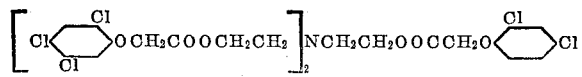

This mixed ester is produced by the same procedure described in Example No. 1 using 100 grams 2,4,5-T acid, 43 grams 2,4-D acid, 29 grams of triethanolamine, and 50 grams of benzene.

EXAMPLE NO. 6

It is possible to produce the alkanolamine esters illustrated as well as any others by regulated heating of a mixture of the alkanolamine and 2,4-dichlorophenoxyacetic acid and/or 2,4,5-trichlorophenoxyacetic acid, without the addition of an inert water immiscible solvent. For example, triethanolamine, 2,4-D di-ester as shown by the following formula:

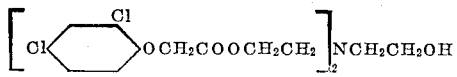

has been made as follows: Into a flask connected to a receiver and to a condenser is placed 100 grams of 2,4-dichlorophenoxyacetic acid and 33.7 grams of triethanolamine. This mixture is heated in an oil bath at 125° C. until the theoretical amount of water (8.15 grams) has been removed . The resulting ester is comparable to that produced by the use of an inert solvent.

In the foregoing examples, reference is made to the use of a water immiscible solvent during the esterification of the alkanolamines with the aryloxy-alkane-carboxylic acid. The solvent takes no part in the chemical reaction, but its presence merely facilitates the removal of water which is a by-product of the esterification. As previously suggested, the reaction may be carried out in the absence of the water immiscible solvent. However, when the solvent is used, the reaction proceeds more smoothly and it is possible to better control the temperature. Also, the solvent helps in the removal of water in that it forms an azeotropic mixture which boils at a lower temperature than the water itself. Thus, the water can be removed from the ester being formed, at a temperature lower than the boiling point of water.

Alkanolamine esters of aryloxy-alkane-carboxylic acids combined with other acid groups The alkanolamine esters of aryloxy-alkane-carboxylic acids have been found to be readily soluble in aromatic solvents such as benzene, toluene, xylene, and high boiling aromatic petroleum derivative solvents, but these esters are only partially soluble in kerosene, diesel fuel and most of the aliphatic petroleum solvents. It may be desirable in certain cases to increase the solubility of these esters, and it has been discovered that the solubility may be increased by esterifying a portion of the hydroxy groups of the alkanolamine with an aryloxy-alkane-carboxylic acid and thereafter esterifying the remaining groups with some other acid radical. Best results have been obtained when using the aliphatic or olefinic fatty acid radicals containing between 7 and 20 carbon atoms to the molecule. Examples of methods for the preparations of the combined esters are given below.

EXAMPLE NO. 7

The triethanolamine 2,4-D di-ester corn oil fatty acid mono-ester is represented by the following formula in which RCOOH represents the corn oil fatty acids:

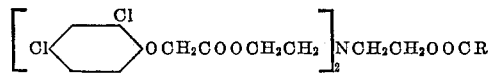

To prepare this ester, 100 grams of 2,4-dichlorphenoxyacetic acid is mixed with 64 grams of corn oil fatty acid, 25 grams of benzene and 33.7 grams of triethanolamine in a closed vessel fitted with a reflux condenser and trap. As this mixture is boiled, esterification proceeds and progress can be followed by measuring the quantity of water condensed and collected in the trap. The excess condensed benzene collects above the water in the trap overflowing back into the distilling vessel. When the theoretical quantity of water has been collected (approximately 12.2 cc.), no further distillation of water is noted, and the esterification is complete. The bottom of the trap is opened allowing the water and benzene to be removed from the system instead of refluxing back into the reaction vessel. All solvent is removed by continued distillation leaving the completed triethanolamine 2,4-D di-ester corn fatty acid mono-ester. This is an oily liquid.

EXAMPLE NO. 8

By a procedure identical to that described above, the triethanolamine 2,4-D di-ester cocoanut oil fatty acid mono-ester may be formed having the structural formula represented by the formula above except that RCOOH represents the cocoanut oil fatty acid radical in place of the corn oil fatty acid radical. To prepare this compound, 100 grams of 2,4-dichlorophenoxyacetic acid, 48.5 grams of cocoanut oil fatty acid, and 33.7 grams of triethanolamine are caused to react in the presence of 25 grams of benzene.

EXAMPLE NO. 9

Also, the triisopropanolamine 2,4,5-T di-ester caprylic acid mono-ester has been prepared and is represented by the following formula:

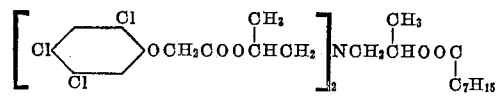

This is prepared by reacting 200 grams of 2,4,5-trichlorophenoxyacetic acid, 57.2 grams of caprylic acid, and 75.2 grams of triisopropanolamine in the presence of 20 grams of benzene. The procedure is similar to that of the first example above.

EXAMPLE NO. 10

Similarly, a combined ester of 2,4-dichlorophenoxyacetic acid, 2,4,5-trichlorophenoxyacetic acid and a third acid can be prepared. An example is triethanolamine 2,4-D mono-ester 2,4,5-T mono-ester caprylic acid mono-ester of the following formula:

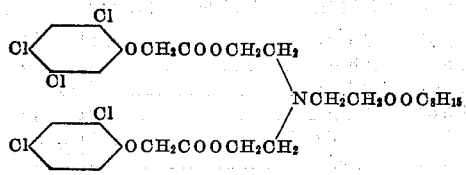

This compound may be made by reacting 100 grams of 2,4-dichlorophenoxyacetic acid, 115.3 grams of 2,4,5-trichlorophenoxyacetic acid, and 66.2 grams of caprylic acid with 67.4 grams of triethanolamine in the presence of 30 grams of ethylene dichloride. The process is similar to that of Example No. 7.

Besides the fatty acids, including corn oil fatty acid, cocoanut fatty acid, and caprylic acid used in the preceding examples, many other acids have been used successfully. Examples are: acetic acid, propionic acid, butyric acid, linoleic acid, oleic acid, stearic acid, myristic acid, palmitic acid and naphthenic acid.

*Preparation of herbicides*

The alkanolamine esters of aryloxy-alkane-carboxylic acids described in the preceding examples are not in the proper physical form for use as herbicides, since only small amounts of the ester are needed to control undesirable vegetation over a large area. These esters, therefore, must be diluted or capable of easy dilution before use. Formulation of these esters to produce readily useable herbicides may be accomplished by:

(1) Diluting the ester with a solvent such as an alcohol, a ketone, an aromatic solvent, an aliphatic solvent, an olefinic solvent, a chlorinated solvent or other suitable solvent to produce a fluid solution readily miscible with kerosene, distillate, fuel oil, diesel fuel or other solvent with which it is mixed at the point of application. In this formulation, 5% or more of solvent is blended with the ester.

(2) Diluting the esters with one or more of the solvents mentioned in (1) and with an emulsifying agent, or the emulsifying agent may be added to the ester without the addition of the solvent. This results in a clear solution which is emulsifiable when mixed with water.

(3) Incorporating or mixing the ester alone or after dilution with a solvent with an inert powdered carrier such as talc, clay, chalk, diatomaceous earth, volcanic ash, bentonite, wood flower or other powdered organic absorbent powder, the quantity of water incorporated in the dust generally should not exceed 40% of the finished material by weight.

Examples of the above-mentioned formulations are:

(a) To 55.8 pounds of triisopropanolamine, 2,4,5-T di-ester is added 44.2 pounds of diacetone alcohol. This combination is stirred until a thin uniform fluid results. This liquid is readily diluted with petroleum solvents for herbicidal uses.

(b) To 55.8 pounds of triisopropanolamine 2,4,5-T di-ester is added 39.2 pounds of xylene and 5 pounds of polyoxyethylene sorbitol oleate-laurate. Upon mixing, a thin, clear uniform liquid is formed which emulsifies readily upon dilution with water and then may be applied as a herbicide.

(c) With 26.4 pounds of triethanolamine 2,4,5-T di-ester is blended 24.8 pounds of triethanolamine 2,4-D tri-ester, 42.8 pounds of xylene, and 6 pounds anhydrous lauryl sulphate. The resulting product is a thin clear liquid which is readily emulsified when diluted with water and then the diluted form may be applied as a herbicide.

(d) With 25.8 pounds of triisopropanolamine 2,4,5-T tri-ester is blended 26.4 pounds triisopropanolamine 2,4-D tri-ester and 47.8 pounds of xylene. These ingredients are stirred together until a uniform free flowing liquid is obtained. The finished preparation is readily diluted with petroleum solvents before use as a herbicide.

(e) With a mixture of 750 pounds of pyrophyllite talc and 150 pounds of attapulgite clay is mixed 63 pounds of triethanolamine 2,4-D di-ester dissolved in 37 pounds of xylene. Thorough mixing produces a uniform powder containing 5%, 2,4-dichlorophenoxyacetic acid equivalent. This is suitable for herbicide use by application by means of dusting equipment.

*Preparation of herbicides with alkanolamine esters of aryloxy-alkane-carboxylic acids combined with other acids*

Examples of formulated herbicides in which a combined alkanolamine ester of an aryloxy-alkane-carboxylic acid and another acid are employed are given below:

(f) With 81.2 pounds of triethanolamine 2,4-D di-ester corn oil fatty acid mono-ester is mixed 18.8 pounds of a high boiling aromatic solvent (Sovacide 544–C produced by Socony Vacuum Oil Company). A liquid of low viscosity is produced which can be blended readily with other petroleum solvents.

(g) With 65.6 pounds of triisopropanolamine 2,4,5-T di-ester caprylic mono-ester is mixed 28.4 pounds of xylene and 6 pounds of lauryl sulphate. The resulting product is a clear liquid of low viscosity which may be diluted with water to form emulsions suitable for herbicidal use.

(h) With 32.8 pounds of triisopropanolamine 2,4,5-T di-ester caprylic mono-ester is thoroughly mixed 34.5 pounds triisopropanolamine 2,4-D di-ester caprylic mono-ester, 27.7 pounds aromatic solvent (E–407 solvent produced by Shell Chemical Company), and 5 pounds polyoxyethylene sorbitol oleate-laurate. Resulting product is a clear liquid of low viscosity which may be diluted with water to form an emulsion suitable for herbicidal application.

(i) Into a mixture of 200 pounds of diatomaceous earth and 680 pounds of kaolin clay is introduced a solution of 78 pounds of triisopropanolamine 2,4,5-T di-ester caprylic mono-ester in 42 pounds of ethylene dichloride. Upon thorough mixing, a uniform powder results containing 5% 2,4,5-trichlorophenoxyacetic acid equivalent. When applied by a dusting machine, this powder is efficient as a herbicide.

Besides polyoxyethylene sorbitol oleate-laurate and lauryl sulphate mentioned as emulsifiers in the above examples, there are many other compounds which can be employed as emulsifiers in preparing readily useable herbicides. Some of these are listed below:

Condensate of ethyleneoxide and fatty acid amids
Di-coco dimethyl quaternary ammonium chloride
Condensate of aliphatic amine with ethyleneoxide
Nonylphenol polyglycol ether
Polyoxyethylene sorbitan esters of mixed fatty and resin acids
Polyoxyethylene sorbitol hexaoleate
Polyoxyethylene sorbitol esters of mixed fatty and resin acids
Polyoxyethylene esters of mixed fatty and resin acids
Polyoxyethylene esters of fatty acids
Polyoxyethylene esters of resin acids
Polyoxyethylene lauryl alcohol From the foregoing, it will be seen that the invention is adapted to attain the ends and objects hereinabove set forth, together with the other advantages which are obvious and inherent to the compositions and processes described.

It will be understood that certain features and subcombinations are of utility and may be employed without reference to other features and subcombinations, and this is contemplated by and is within the scope of the claims.

As many possible embodiments may be made of the invention without departing from the scope thereof, it is to be understood that all matter herein set forth is to be interpreted as illustrative and not in a limiting sense.

Having thus described our invention, we claim:

1. A herbicidal composition containing as an active ingredient an ester of a polyalkanolamine having a portion of the hydroxy groups esterified with an aryloxy-alkane-carboxylic acid and a portion esterified by an acid containing 7 to 20 carbon atoms of the group consisting of aliphatic acids, olefinic acids and naphthenic acids.

2. A herbicidal composition as in claim 1 wherein the polyalkanolamine is of the group consisting of diethanolamine, diisopropanolamine, triethanolamine, triisopropanolamine, phenyldiethanolamine, and ethyldiethanolamine.

3. A composition as in claim 1 wherein the aryloxy-alkane-carboxylic acid is of the group consisting of 2,4-dichlorophenoxyacetic acid and 2,4,5-trichlorophenoxyacetic acid.

References Cited in the file of this patent

UNITED STATES PATENTS

| | | |
|---|---|---|
| 2,390,941 | Jones | Dec. 11, 1945 |
| 2,510,839 | Shmidl | June 6, 1950 |
| 2,543,397 | Allen | Feb. 27, 1951 |
| 2,557,618 | Stull | June 19, 1951 |
| 2,614,919 | Warren | Oct. 21, 1952 |
| 2,628,973 | Cusic | Feb. 17, 1953 |

OTHER REFERENCES

J. American Chemical Society, vol. 69 (1947), pages 718 to 723.